United States Patent [19]
Fujieda

[11] Patent Number: 5,926,286
[45] Date of Patent: Jul. 20, 1999

[54] IMAGE SENSOR APPARATUS WITH SMALL CONVEX PORTIONS

[75] Inventor: Ichiro Fujieda, Tokyo, Japan

[73] Assignee: NEC Corporation, Tokyo, Japan

[21] Appl. No.: 08/851,458

[22] Filed: May 5, 1997

[51] Int. Cl.⁶ .................................................. H04N 1/04
[52] U.S. Cl. ...................... 358/475; 358/483; 358/484; 358/474
[58] Field of Search .................... 358/475, 474, 358/483, 482, 509, 471, 505, 484, 496; 382/313; 250/208.1, 227.2, 227.26, 578.1, 216; 359/451, 457, 738, 800, 798; 362/800, 32, 31, 545, 454

[56] References Cited

U.S. PATENT DOCUMENTS

| | | | |
|---|---|---|---|
| 4,935,665 | 6/1990 | Murata | 362/800 |
| 5,442,482 | 8/1995 | Johnson | 359/619 |
| 5,521,725 | 5/1996 | Beeson et al. | 362/31 |
| 5,617,131 | 4/1997 | Murano et al. | 250/208.1 |

FOREIGN PATENT DOCUMENTS 5-227367  9/1993  Japan.
6-291935  10/1994  Japan.

Primary Examiner—Edward L. Coles
Assistant Examiner—Cheukfan Lee
Attorney, Agent, or Firm—Sughrue, Mion, Zinn Macpeak & Seas, PLLC

[57] ABSTRACT

In an image sensor apparatus, a light emitting section is composed of a plurality of light emitting elements provided in a longitudinal direction of said image sensor apparatus. An optical section has an uneven structure, and changes the direction of light such that the light emerges from the optical section in a substantially parallel manner and converges to a linear region along the longitudinal direction. Here, the uneven structure includes a plurality of convex or concave portions, and a length of each of the plurality of convex or concave portions of the uneven structure in the longitudinal direction is smaller than a separation between adjacent two of the plurality of light emitting elements. An image sensor section transmits the converged light to a manuscript and for sensing a light reflected from the manuscript.

23 Claims, 10 Drawing Sheets

IMAGE SENSOR APPARATUS WITH SMALL CONVEX PORTIONS

BACKGROUND OF THE INVENTION

1. Field of the Invention

The present invention relates to an image sensor apparatus which is installed in an image input apparatus such as a facsimile and a hand-held scanner.

2. Description of Related Art

A fully contact type image sensor apparatus is conventionally known which is installed in a small image input apparatus such as a facsimile and a hand-held scanner. FIG. 1 is a perspective view illustrating the first conventional example of a fully contact type image sensor apparatus 50. Also, FIG. 2 is a cross sectional view illustrating the first conventional example of the image sensor apparatus cut along the line X—X in FIG. 1. Referring to FIGS. 1 and 2, the first conventional example of image sensor apparatus 50 is composed of a linear light source 60, a linear image sensor section 70, and an optical fiber binding section 80.

The linear light source 60 is composed of a printed circuit board 61, a reflection frame 62, and a cylindrical rod-shaped lens 63. The printed circuit board 61 is provided for a plurality of light emitting elements 64 to be arranged in a linear manner on the lower surface of the printed circuit board 61, Also, a reference numeral 65 denotes a wiring for connecting the light emitting element 64 to the printed circuit board 61.

The linear image sensor section 70 is composed of a transparent substrate 71 and a train of pixels 72. The train of pixels 72 includes photoelectric converting elements of thin film semiconductor elements which are formed of amorphous silicon. The train of pixels 72 is provided in the lower portion of the transparent substrate 71.

The optical fiber binding section 80 is composed of an optical fiber section 81 and a support body 82. In the optical fiber section 81, a plurality of optical fibers 81A are bound to turn to upper and lower directions in FIG. 2. The support body 82 supports the optical fiber section 81. The one end of the bunch of the plurality of optical fibers 81A is fit in a facing state to the pixel train 72 and the other end faces a manuscript P.

Next, the operation of the above-mentioned first conventional example of an image sensor apparatus will be described below.

First, light is emitted in all directions from the light emitting surface of each of the light emitting elements 64 and converged in a linear manner along the longitudinal direction of the cylindrical lens 63. After passing the transparent substrate 71 and the gaps between the pixels of the train 72, the converged light is incident into the optical fiber section 81. The light which has passed through the plurality of optical fibers 81A irradiates the manuscript P. The light reflected from the manuscript P passes through the same optical fibers 81A and is detected by the pixel train 72. In this manner, black and white information of the manuscript P can be obtained.

In this case, in order to improve the quality of the image obtained by the image sensor apparatus, it is generally desirable that an illumination distribution of light on the manuscript P is uniform. In this conventional example, however, the illumination distribution varies in accordance with a numerical aperture (NA) of the optical fibers 81A.

FIG. 3 is a diagram illustrating an illumination distribution. In FIG. 3, each of the dashed lines corresponds to a region where each of the light emitting elements 64 is provided. As seen from FIG. 3, if the numerical aperture of each of the optical fibers 81A is small, there is a remarkable difference in the illumination distribution between the regions downward corresponding to a region between every adjacent two of the light emitting elements 64 and the region downward corresponding to each of the light emitting elements 64. According to the illumination distribution shown in FIG. 3, the illumination on the manuscript P decreases most in the regions of the manuscript P which correspond to the regions between every adjacent two of the light emitting elements 64. This is because the light emitted by the light emitting elements 64 reaches the optical fibers 81A with an inclined angle larger than a critical angle determined by the numerical aperture NA of each optical fiber, so that the light can not be transferred inside the optical fibers 81A.

If the optical fiber binding section 80 composed of a plurality of optical fibers 81A having a large numerical aperture NA is used, a good uniformity in the illumination distribution can be achieved. However, if there is a gap between the manuscript P and the optical fiber binding section 80, the reflected light is detected from a region wider than a predetermined area of the manuscript P. Therefore, the image quality (resolution) tends to degrade.

In this way, in the first conventional example of the image sensor apparatus 50, there is a problem of illumination uniformity. The uniformity of the illumination distribution on the manuscript P is degraded when the optical fibers 81A having a small numerical aperture NA is used. The resolution is easily degraded by the presence of a gap between the manuscript P and the optical fiber binding section 80 when the optical fibers 81A having a large numerical aperture NA are used.

Next, the second conventional example of an image sensor apparatus is disclosed in Japanese Laid Open Patent Disclosure (JP-A-Heisei 5-227367). FIG. 4 is a vertical cross sectional view of the second conventional example of an image sensor apparatus and FIG. 5 is a horizontal cross sectional view for some of its components.

As shown in FIG. 4, the second conventional example of the image sensor apparatus is composed of a linear light source 92, an optical section 91, an array of gradient index optical fibers 95 and a linear image sensor section 96 mounted on a printed circuit board 97. The linear light source 92 is composed a plurality of light emitting diodes 93 which are arranged in a linear manner and irradiate a manuscript P through the optical section 91. The array of gradient index optical fibers 95 focuses the light reflected from the manuscript P on the linear image sensor section 96. The linear image sensor section 96 reads an image of the manuscript P by detecting the reflected light focused by the array of gradient index optical fibers 95.

Here, the optical section 91 is provided with convex portions 99, each of which has the length equal to the separation between the two adjacent light emitting diodes as shown in FIG. 5. This optical section 91 improves the uniformity of the manuscript illumination by changing the direction of light via refraction. It is necessary for the convex portions 99 to have the thickness in correspondence to the arrangement pitch.

However, the arrangement pitch of the light emitting diodes is determined by taking the illumination uniformity and a manufacturing cost into account and is usually equal to or larger than 3 mm. For this reason, if the above-mentioned second conventional example is applied for the fully contact type image sensor apparatus as shown in FIG.

1, the apparatus would have a large-sized structure. As a result, the advantage of the fully contact type image sensor apparatus is lost.

SUMMARY OF THE INVENTION

The present invention is made in the light of the above-mentioned circumstances. An object of the present invention is to provide an image sensor apparatus in which a uniform illumination distribution on a manuscript can be achieved.

Another object of the present invention is to provide an image sensor apparatus in which degradation of resolution can be prevented while maintaining the small size.

In order to achieve an aspect of the present invention, an image sensor apparatus includes a light emitting section composed of a plurality of light emitting elements provided in a longitudinal direction of the image sensor apparatus, an optical section having an uneven structure, for changing the direction of light such that the light emerges from the optical section in a substantially parallel manner and converges to a linear region along said longitudinal direction, and an image sensor section for transmitting the converged light to a manuscript and for sensing a light reflected from the manuscript. The uneven structure includes a plurality of convex or concave portions, and a length of each of the plurality of convex or concave portions of the uneven structure in the longitudinal direction is smaller than a separation between adjacent two of the plurality of light emitting elements.

In the present invention, the optical section may include a cylindrical lens having a length corresponding to said light emitting section in the longitudinal direction, for converging the light, emitted from the plurality of light emitting elements, in the linear manner, and a lens sheet having the uneven structure, for directing the converged light to the manuscript. In this case, the lens sheet may be provided on the side of plurality of light emitting element or the side of the manuscript. Alternatively, the optical section may include a cylindrical lens having the uneven structure and having a length corresponding to the light emitting section in the longitudinal direction.

The uneven structure may include a plurality of uneven sections each of which is composed of the plurality of convex or concave portions, and each of the plurality of uneven sections is provided in a region corresponding to a region between every adjacent two of the plurality of light emitting elements. Alternatively, the uneven structure is the plurality of convex or concave portions which are continuously provided in the longitudinal direction for a length corresponding to the light emitting section.

In order to achieve another aspect of the present invention, an image sensor apparatus includes a light emitting section composed of a plurality of light emitting elements provided in a longitudinal direction, a cylindrical lens for converging light emitted from the plurality of light emitting elements, in a linear manner in a longitudinal direction, a lens sheet having an uneven structure, for directing the converged light to a manuscript, and an image sensor section for transmitting the converged light from the lens sheets to the manuscript and for sensing a light reflected from the manuscript. The uneven structure is composed of a plurality of convex or concave portions, and a length of each of the plurality of convex or concave portions of the uneven structure in the longitudinal direction is smaller than a separation between adjacent two of the plurality of light emitting elements.

In the present invention, the uneven structure may be provided on a side of the light emitting section or on a side of the manuscript.

In order to achieve still another aspect of the present invention, an image sensor apparatus includes a light emitting section composed of a plurality of light emitting elements provided in a longitudinal direction, a lens sheet having an uneven structure, for directing to a manuscript the light emitted from the plurality of light emitting elements, a light converging section for converging the directed light in a linear manner in the longitudinal direction, and an image sensor section for transmitting the converged light to the manuscript and for sensing a light reflected from the manuscript. Here, the uneven structure includes a plurality of convex or concave portions, and a length of each of the plurality of convex or concave portions of the uneven structure in the longitudinal direction is smaller than a separation between adjacent two of the plurality of light emitting elements.

DESCRIPTION OF THE PREFERRED EMBODIMENTS

The fully contact type image sensor apparatus of the present invention will be described below in detail with reference to the accompanying drawings.

Figure 1:
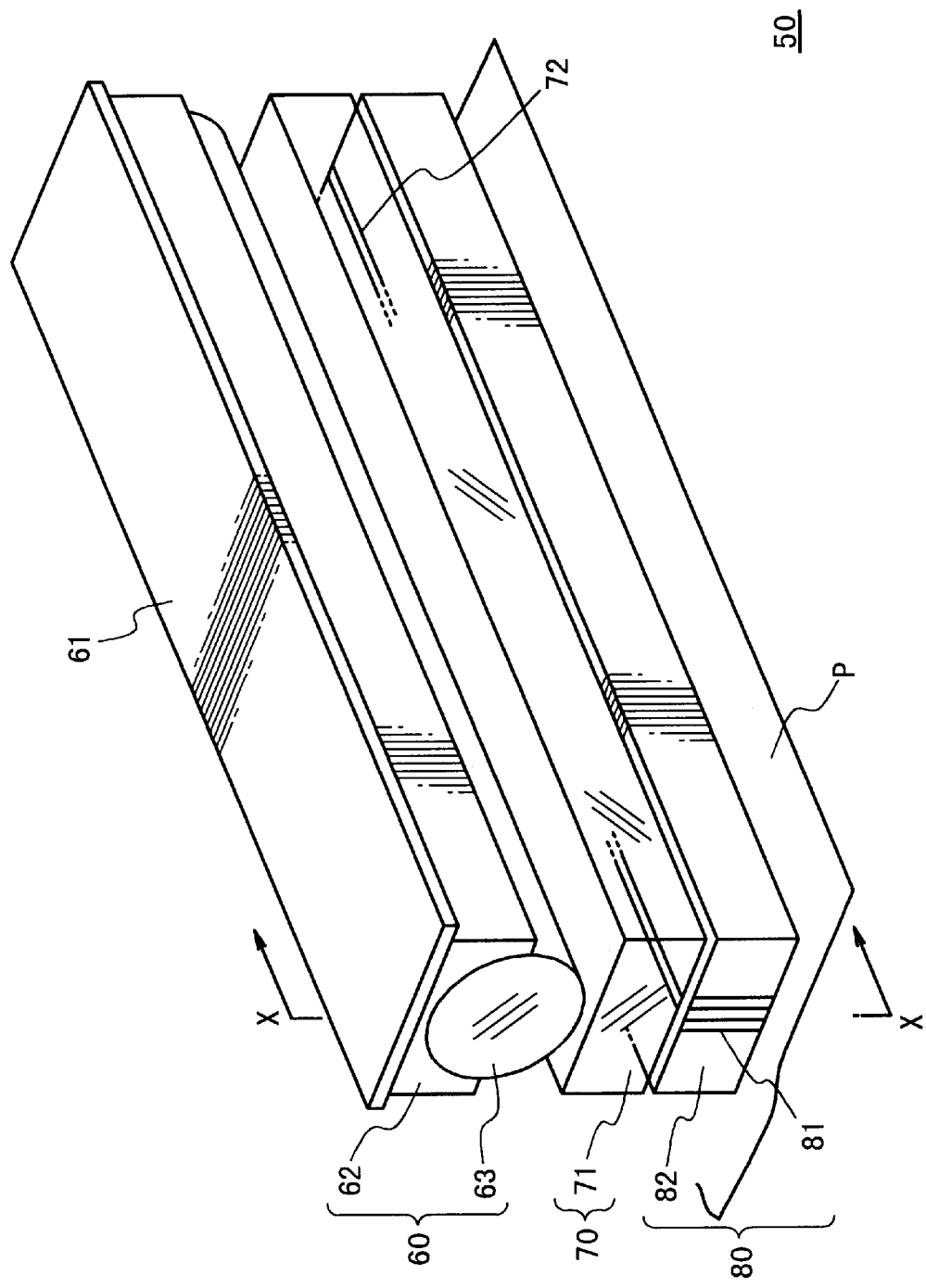
FIG. 1 is a perspective view of a first conventional example of a fully contact type image sensor apparatus.
Figure 2:
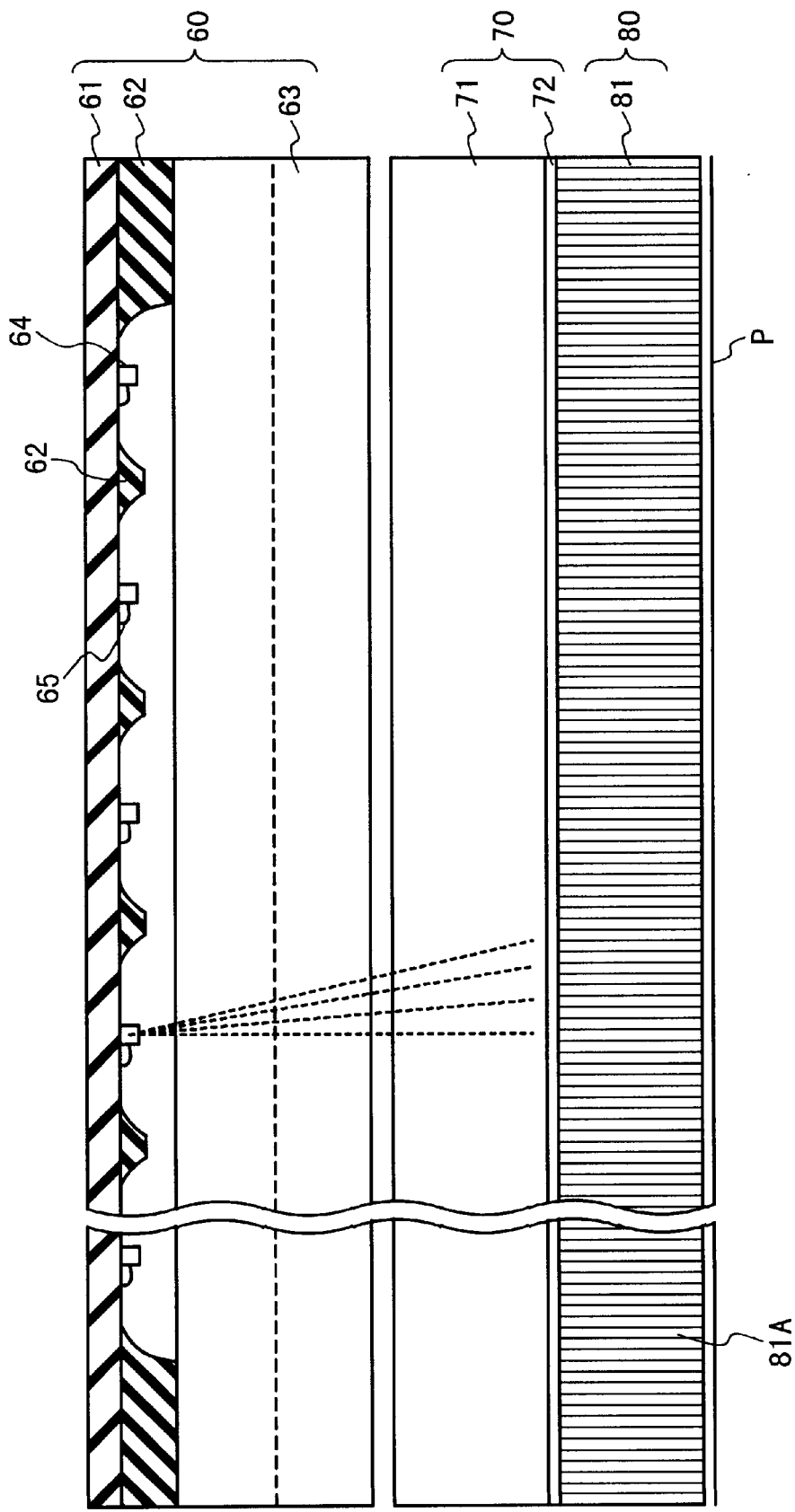
FIG. 2 is a cross sectional view of the first conventional example of the fully contact type image sensor apparatus when it is cut along the line X—X in FIG. 1.
Figure 3:
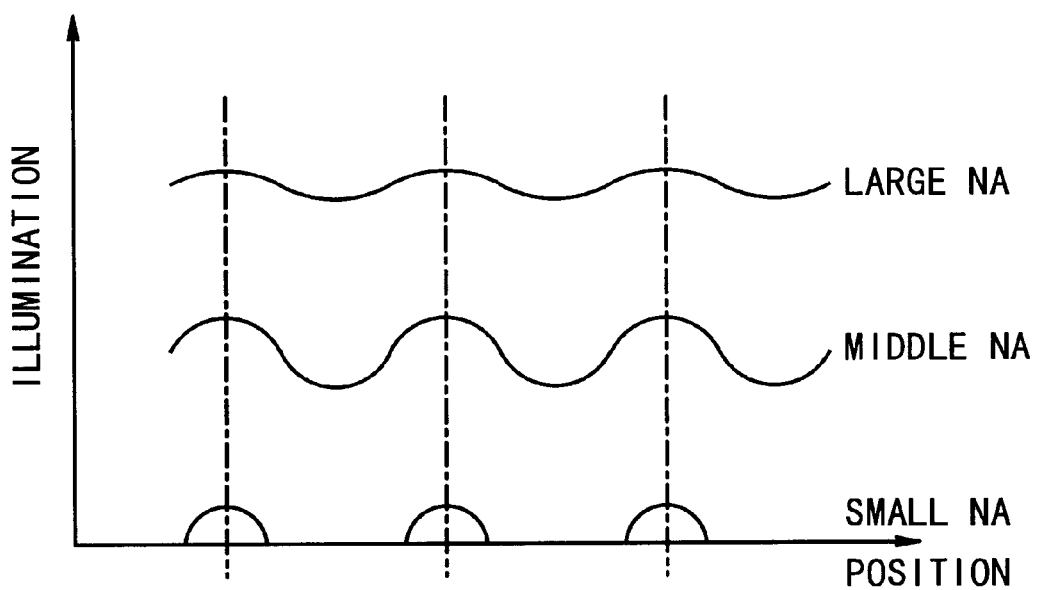
FIG. 3 is a diagram illustrating a relation between the numerical aperture of an optical fiber and an illumination distribution.
Figure 4:
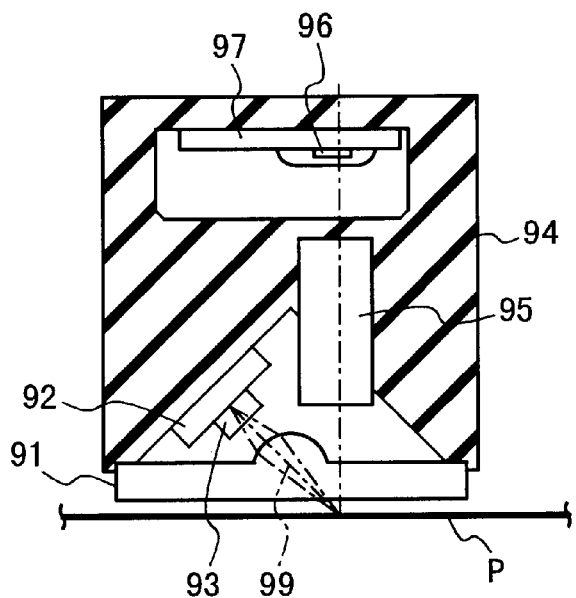
FIG. 4 is a cross sectional view illustrating a second conventional example of an image sensor apparatus in the direction perpendicular to the arrangement direction of light emitting diodes.
Figure 5:
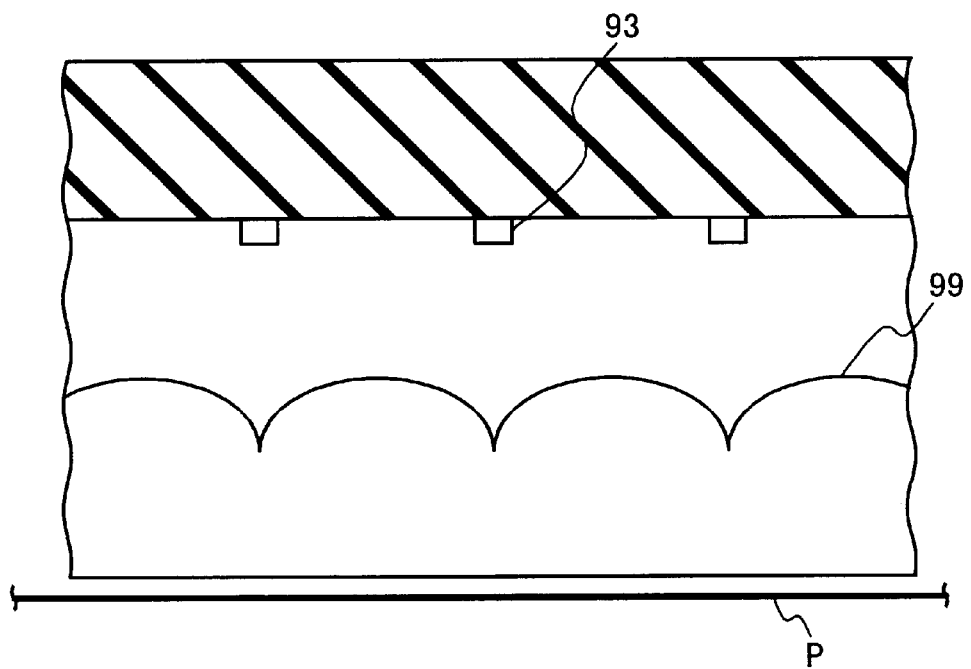
FIG. 5 is a cross sectional view illustrating a portion of the second conventional example of the image sensor apparatus in the arrangement direction of the light emitting diodes.
Figure 6:
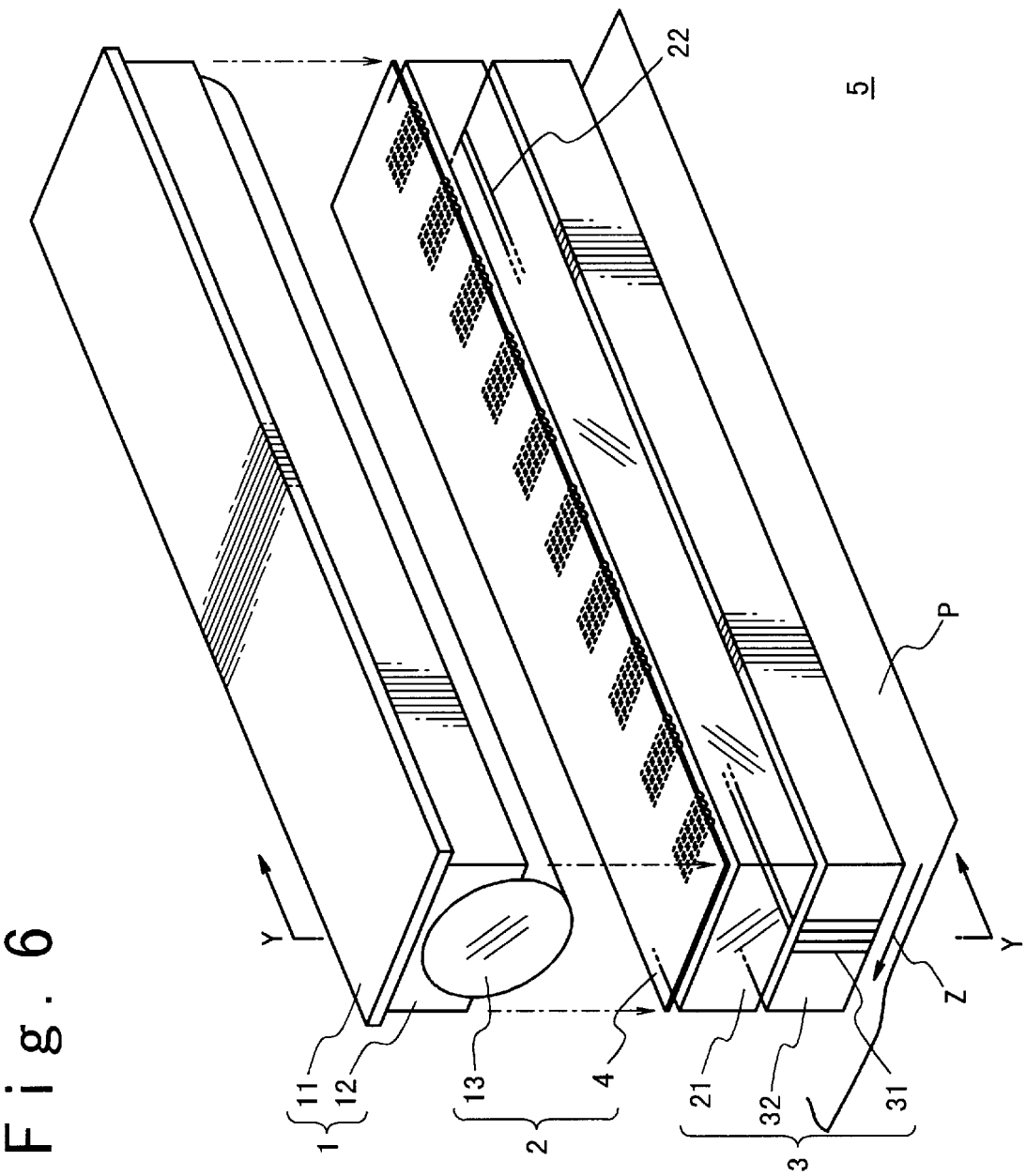
FIG. 6 is a perspective view illustrating a fully contact type image sensor apparatus according to the first embodiment of the present invention.
Figure 7:
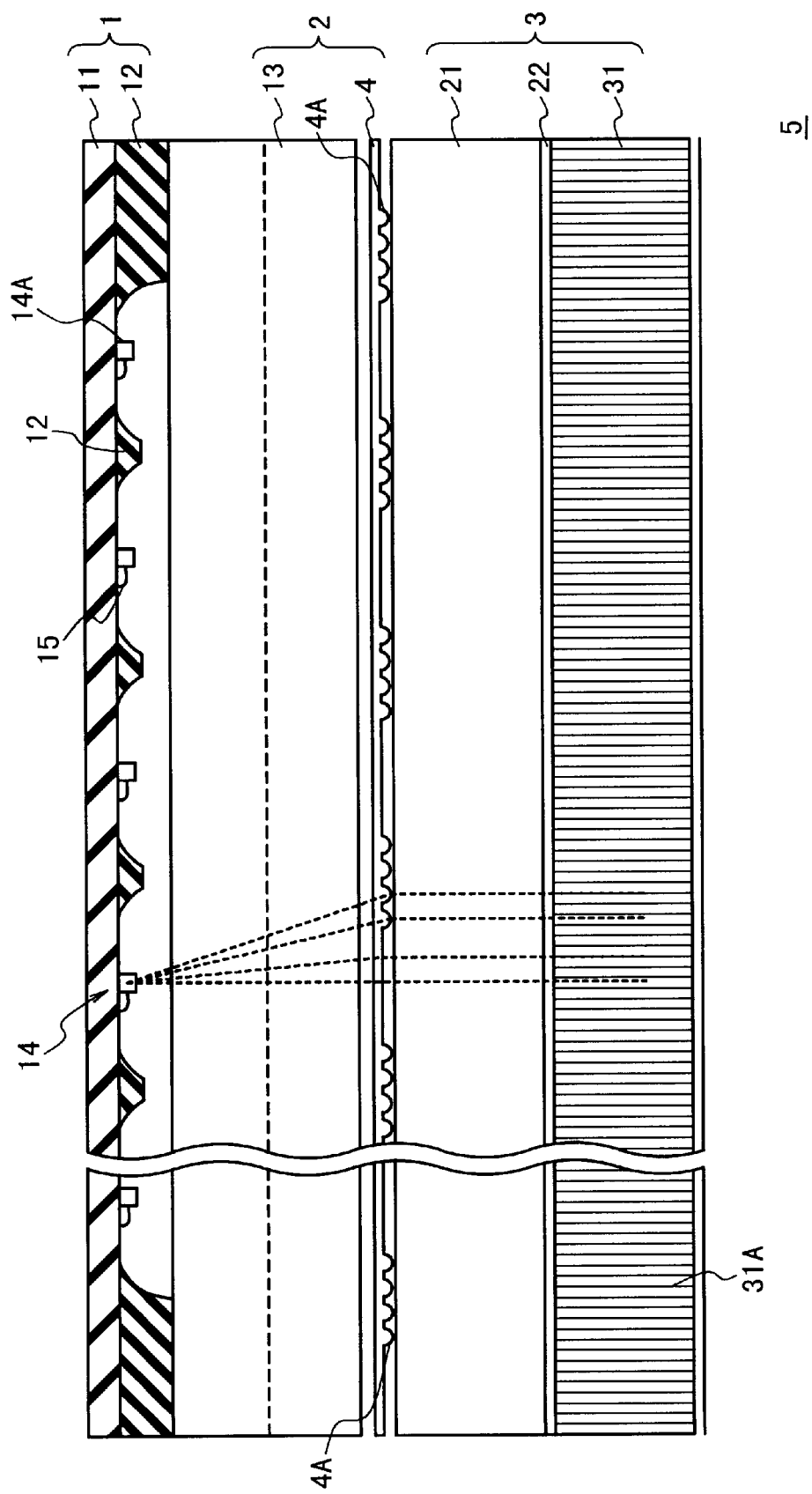
FIG. 7 is a cross sectional view illustrating the fully contact type image sensor apparatus of the first embodiment when it is cut along the line Y—Y in FIG. 6.

FIG. 6 is a perspective view illustrating the image sensor apparatus 5 according to the first embodiment of the present invention which is used as an image input apparatus such as a facsimile and a hand-held scanner. In the structure shown in FIG. 6, a manuscript P is sent to the direction shown by an arrow Z and the input of the manuscript is performed by the image sensor apparatus 5. Also, FIG. 7 is a cross sectional view illustrating the image sensor apparatus 5 according to the first embodiment of the present invention when it is cut along the line Y—Y in FIG. 6. Referring to FIGS. 6 and 7, the fully contact type image sensor apparatus according to the first embodiment of the present invention will be described below.

The fully contact type image sensor apparatus 5 is composed of a linear light source section 1 which emits light toward a manuscript P, a light converging section 2 which is composed of a cylindrical lens 13 and a lens sheet 4, and a sensor section 3 which is composed of a transparent substrate 21, a linear image sensor section 22, and an optical fiber section 31.

The linear light source section 1 is composed of a printed circuit board 11, a reflection frame 12 provided on the side of the lower surface of the printed circuit board 11, and a light emitting section 14. The light emitting section 14 is composed of a plurality of light emitting diodes 14A which are linearly provided in the lateral direction in FIG. 7 in the state directing to the manuscript P. In the reflection frame 12, a concave mirror is provided for each of the light emitting diodes 14A such that the light emitted from the light emitting diode 14A is directed to the manuscript. Also, a reference numeral 15 is a wiring for connecting the light emitting element 14A to the printed circuit board 11.

The light converging section 2 is provided under the linear light source section 1 and is composed of the cylindrical lens 13 and the lens sheet 4. The cylindrical lens 13 is provided along the direction of the arrangement of the light emitting diodes 14A of the light emitting section 14.

The lens sheet 4 is provided under the cylindrical lens 13 such that the upper flat surface of the lens sheet 4 is turned to the side of the light emitting diodes 14A. The lens sheet 4 has the length approximately equal to that of the cylindrical lens 13 in the lateral direction in FIG. 7. The lens sheet 4 has an uneven surface structure on the side of the manuscript P along the direction of the arrangement of the light emitting diodes 14A. The uneven surface structure is composed of a plurality of uneven surface sections. Each of the uneven surface sections is formed in the region straightly downward the region between every adjacent two of the plurality of light emitting diodes 14A but not the region straightly downward the region where each of the light emitting diodes 14A is provided. Each of the uneven surface sections is composed of a plurality of concave or convex portions 4A periodically provided along the direction of the arrangement of the light emitting diodes 14A. The uneven surface sections refract the light converged by the cylindrical lens 13 such that the light is approximately perpendicularly directed to the manuscript P. Each of the plurality of convex or concave portions 4A has a semicircular section shape and the length of each convex portion 4A is much smaller than the separation between the two adjacent light emitting diodes 14A, i.e., the arrangement pitch of the light emitting diodes 14A, as shown in FIG. 7.

Here, the detail shape of the convex or concave portion 4A is calculated by the ray tracing method such that the light is made sufficiently parallel to each other.

The sensor section 3 is provided under the lens sheet 4, i.e., on the side of the manuscript P. The sensor section 3 is composed of the transparent substrate 21, the linear image sensor section 22 and the optical fiber section 31.

The linear image sensor section 22 is composed of a plurality of photoelectric converting elements which are linearly arranged on the lower surface of the transparent substrate 21. The photoelectric converting elements are formed of thin film semiconductor such as amorphous silicon. Each of the photoelectric converting elements has a plurality of windows for transmitting the light, as described in Japanese Laid Open Patent Disclosure (JP-A-Heisei 6-291935). Each of the windows has a shorter width than the diameter of each optical fiber 31A.

The optical fiber section 31 is provided on the side of the manuscript P under the linear image sensor section 22 and is formed by binding a plurality of optical fibers 31A. The plurality of optical fibers 31A are arranged in the vertical direction in FIG. 7, i.e., the direction perpendicular to the manuscript. The optical fiber section 31 includes a support 32 to support the plurality of optical fibers 31A in that state. One end of each of the bound optical fibers is fit to the linear image sensor section 22 and the other end contacts the manuscript P.

Next, the operation of the image sensor apparatus of the first embodiment having the above-mentioned structure will be described.

First, the light emitting diodes 14A in the light emitting section 14 emit light in all directions. Some of the emitted light is directed toward the manuscript P by the reflection frame 12. The light passes through the cylindrical lens 13 so that it is converged in the direction of Z in FIG. 6. Thus, the light is converted in the linear manner along the direction of the arrangement of the light emitting diodes 14A. The direction of this light along the Y direction in FIG. 6 is still distributed.

Next, this light enters the lens sheet 4. The lens sheet 4 transmits the light traveling substantially straightly downward just as it is. Also, the lens sheet 4 refracts the light incident with an inclined angle such that the refracted light travels substantially straightly downward. As a result, the light is made substantially uniformly parallel with respect to the direction of the optical fibers 31A and then enters the sensor section 2.

The linear image sensor section 22 of the sensor section 2 passes a portion of the light traveling downward through the above-mentioned windows. The passed light is incident to the optical fibers 31A and is transferred inside. Then, the light irradiates the manuscript P. The light is reflected from the manuscript P and the reflected light is transferred through the optical fibers 31A to the linear image sensor section 22. The linear image sensor section 22 detects the reflected light in a region other than the above-mentioned windows. In this manner, the image of the manuscript can be detected.

As described above, in this embodiment, the light emitted by the light emitting diodes 14A is incident to each of the optical fibers 31A through the lens sheet 4. Accordingly, the light is incident to these optical fibers 31A in the state in which the light is made substantially parallel along the direction of the arrangement of the optical fibers 31A. Therefore, the light distribution on the manuscript can be made uniform along the direction of the arrangement of the light emitting diodes 14A. When the image sensor apparatus 5 of the present invention is applied to an image reading apparatus such as a facsimile, hand-held scanner and so on, an image can be read with a high precision.

Also, because the illumination distribution can be made uniform, each of the optical fibers 31A needs not to have a large numerical aperture (NA). Therefore, even when there is a gap between the optical fiber section 31 and the manuscript P, the conventional problem of resolution degradation can be prevented.

In the first embodiment described above, the lens sheet 4 has the uneven surface sections which are distributedly arranged. However, the present invention is not limited to this. The lens sheet 4 may have the uneven surface structure in which a plurality of convex or concave portions 4A are continuously provided.

Figure 8:
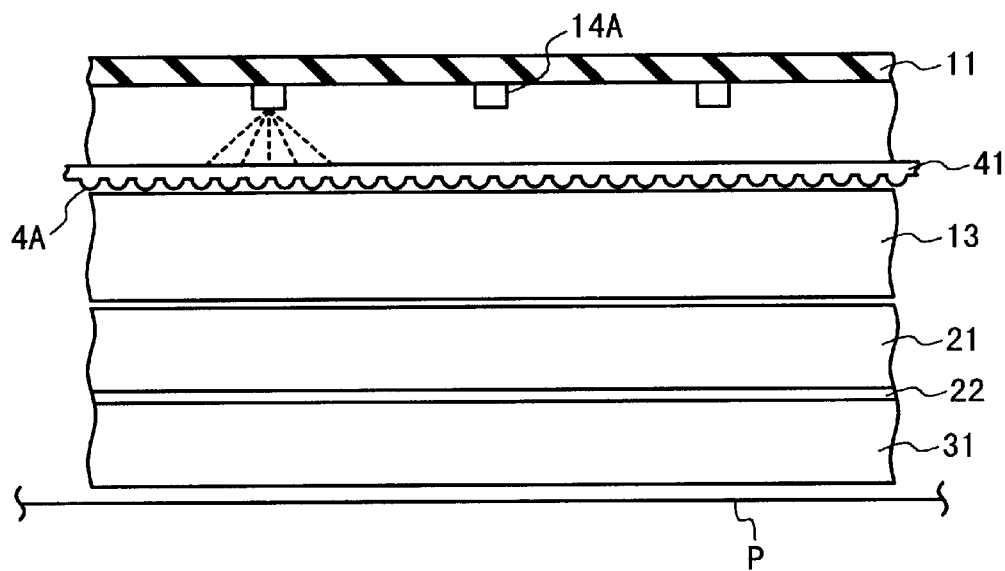
FIG. 8 is a cross sectional view illustrating the fully contact type image sensor apparatus according to the second embodiment of the present invention in the direction of the arrangement of light-emitting diodes.

In the image sensor apparatus according to the second embodiment of the present invention, as shown in FIG. 8, the lens sheet 41 is provided between the light emitting section 14 and the cylindrical lens 13. The lens sheet 41 has the uneven surface structure composed of a plurality of convex or concave portions 4A which are continuously provided. It is desirable that a predetermined gap is provided between the light emitting diodes 14A and the lens sheet 41. In this case, the same effect as described in the first embodiment can be achieved. The uneven surface structure of the lens sheet 41 is provided on the side of the manuscript P in this example. However, the uneven surface structure may be provided on the side of the light emitting diodes 14A. In this case, the effect is slightly reduced, compared to the case where the uneven surface structure is provided on the side of the manuscript P.

Figure 9:
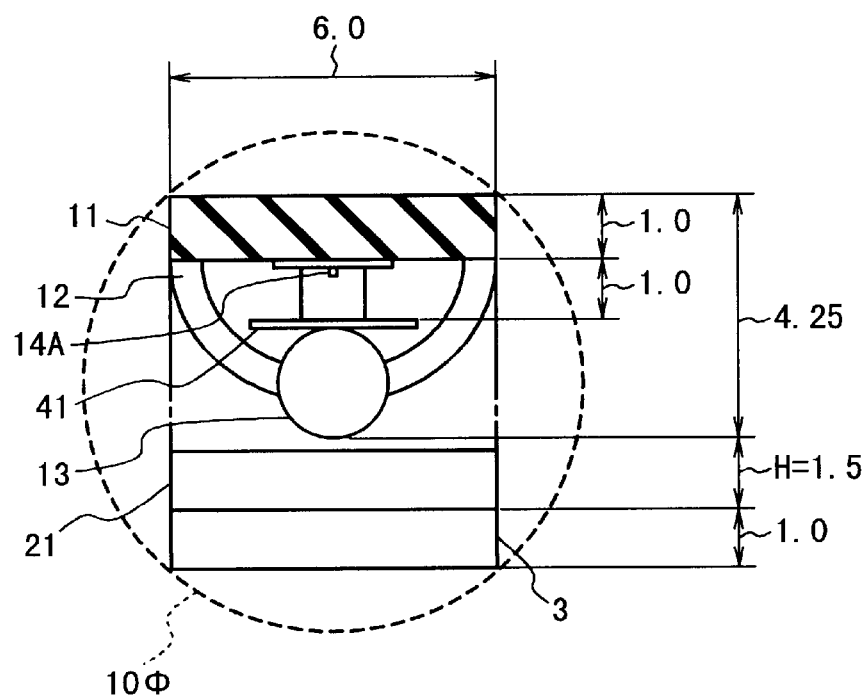
FIG. 9 is a cross sectional view illustrating the fully contact type image sensor apparatus according to the second embodiment of the present invention along the direction perpendicular to the direction of the arrangement of light-emitting diodes.

FIG. 9 is a cross sectional view of the image sensor apparatus in the second embodiment when the image sensor apparatus having the structure shown in FIG. 8 is cut in the direction perpendicular to the direction of the arrangement of the light emitting diodes 14A.

In the image sensor apparatus in the second embodiment, light emitting diodes of a surface mount type enclosed by resin are used. The lens sheet 41 is arranged to fit to this resin. The lens sheet 41 has, on the side of the manuscript P, the uneven surface structure in which wave-shaped portions 4A are continuously provided. The period of the wave-shaped portion is 100 µm. The height of the lens sheet 41 is about 250 µm. The cylindrical lens 13 having the diameter of 2 mm, the image sensor 22 having the thickness of 1 mm, and the optical fiber section 31 having the thickness of 1 mm are combined. As a result, all the components of the image sensor apparatus can be accommodated in a region having the diameter of 10 mm.

Figure 10:
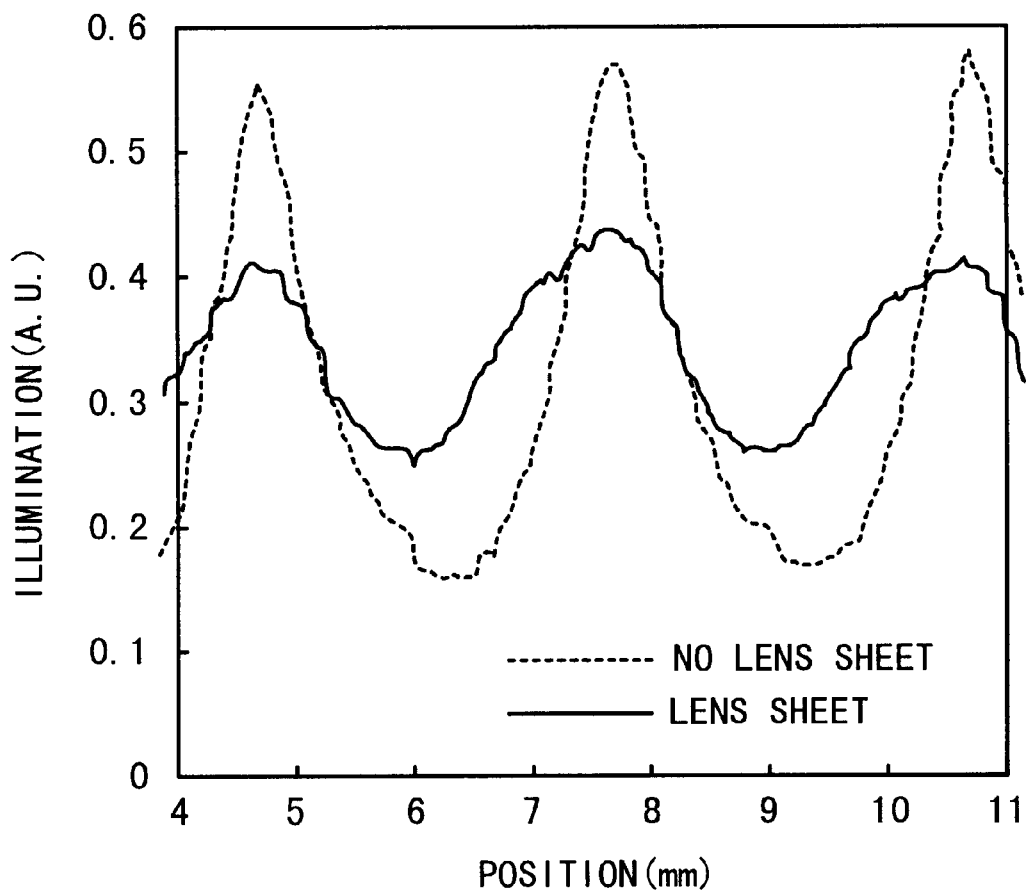
FIG. 10 is a diagram comparing illumination distributions obtained with and without a lens sheet.

FIG. 10 is a diagram illustrating the measurement results of the illumination distributions in the position of the manuscript P in the structure shown in FIG. 9. The solid line indicates the result with the lens sheet 41 and the broken line indicates the result with no lens sheet. As seen from FIG. 10, when the lens sheet 41 is provided, the illumination distribution is made flattened. Thus, the uniformity of the illumination distribution is improved.

Figure 11:
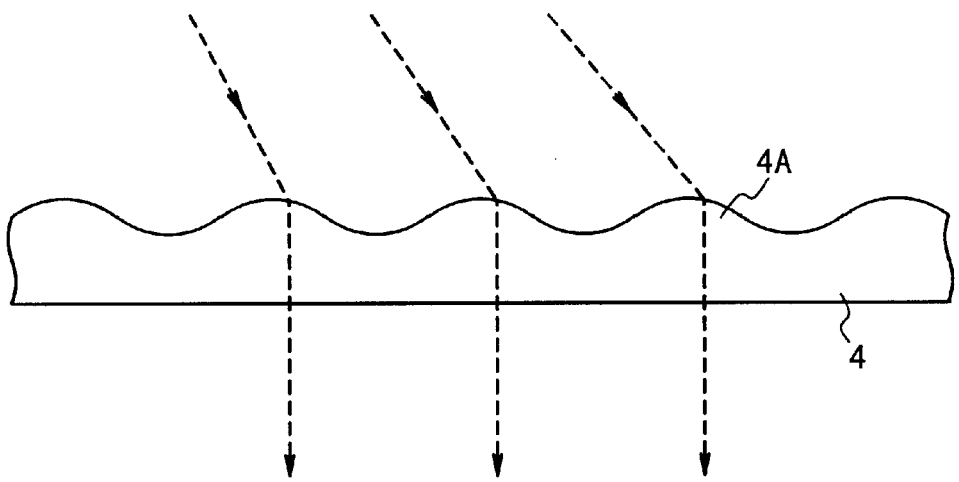
FIG. 11 is a diagram illustrating a first modification of the lens sheet in the fully contact type image sensor apparatus in the first and second embodiments.
Figure 12:
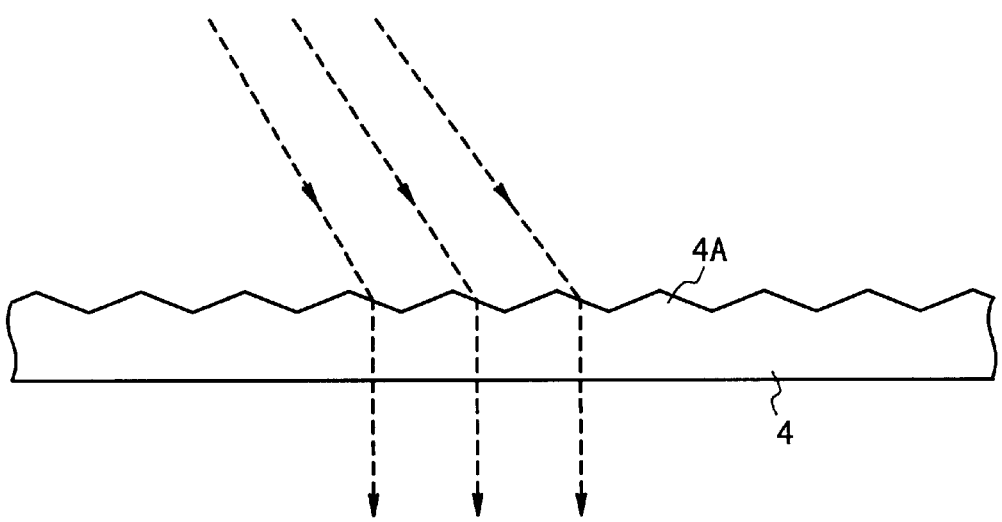
FIG. 12 is a diagram illustrating a second modification of the lens sheet in the fully contact type image sensor apparatus in the first and second embodiments.

Each of the convex portions 4A has a semicircular cross section, as shown in FIG. 7. However, each convex portion may have a wave-shaped cross section as shown in FIG. 11 or a triangular cross section as shown in FIG. 12. Even in these case, the illumination uniformity is improved as in the first embodiment.

The exact size and the shape of each convex portion 4A may be individually designed using the ray tracing method. Thereby, the light emitted by the light emitting diodes 14A can be made parallel to the direction of the optical fibers 31A with a higher precision. As a result, the illumination distribution on the manuscript can be made to be more uniform.

Also, the structure of the linear image sensor section 22 is not limited to the structure described in the first embodiment. The same effect as in the first embodiment can be obtained by flip-installing a CCD or a MOS-type image sensor to the optical fiber section 31.

Figure 13:
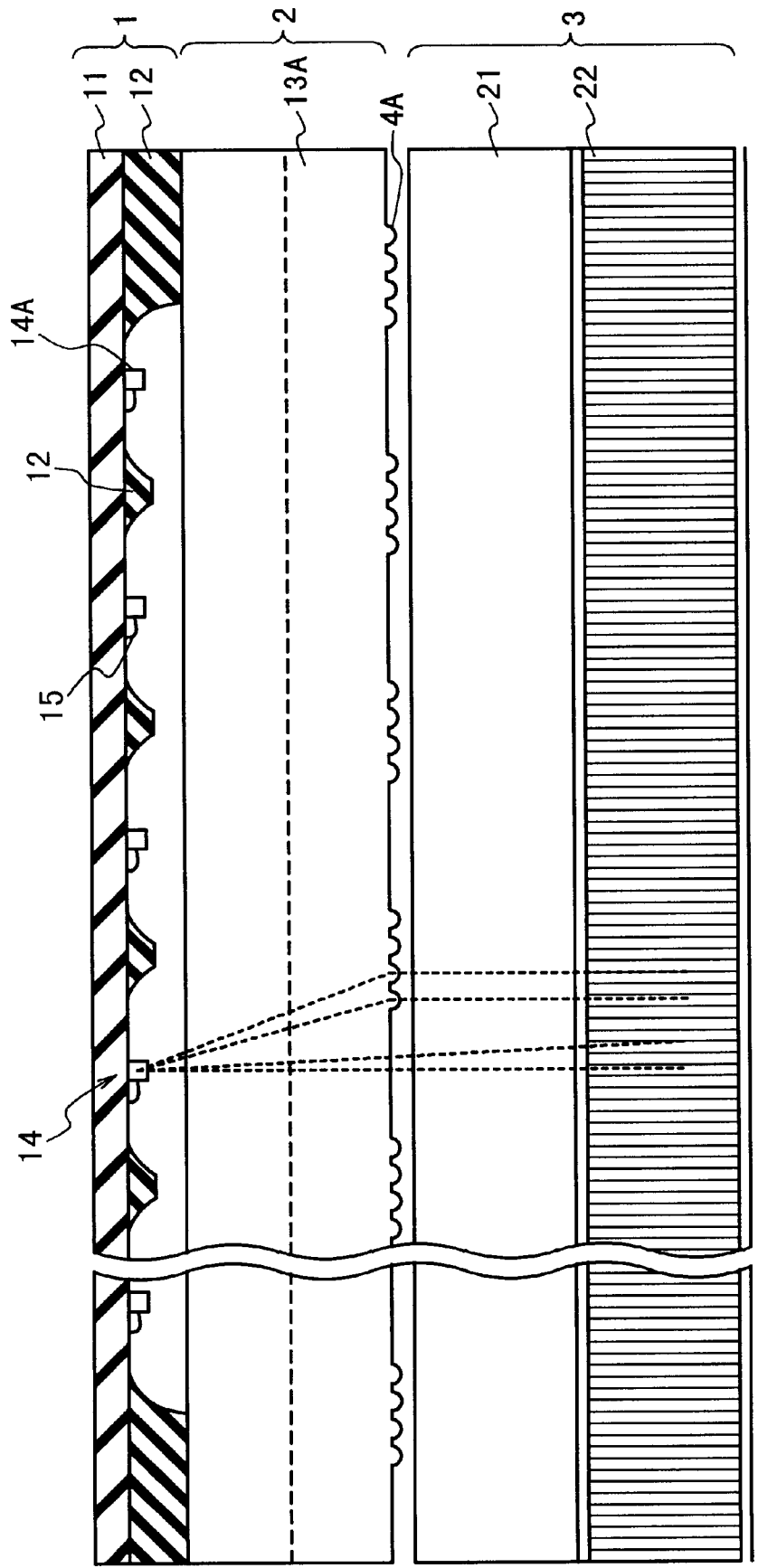
FIG. 13 is a cross sectional view illustrating the fully contact type image sensor apparatus according to the third embodiment of the present invention along the direction of the arrangement of light-emitting diodes.

Next, the image sensor apparatus according to the third embodiment of the present invention in which another optical means is used in place of the above lens sheet 4 will be described below with reference to FIG. 13.

The other optical means is composed of a cylindrical lens 13A which has the uneven surface structure composed of a plurality of uneven sections. Each of the uneven sections is provided on the outer surface of the cylindrical lens 13A on the side of the manuscript P along the direction of the arrangement of the light emitting diodes 14A. That is, each of the uneven sections is provided in the regions other than the regions straightly downward from the light emitting diodes 14A. Each of the uneven sections is composed of a plurality of convex portions 4A. The pitch between the two adjacent convex portions is sufficiently small, compared to the separation between the two adjacent light emitting diodes 14A.

The light emitted by the light emitting diodes 14A is made parallel to each other by the cylindrical lens 13A with the uneven surface structure. That is, the cylindrical lens 13A functions in the same manner as the combination of the cylindrical lens 13 and the lens sheet 4 in the first embodiment. The uneven surface structure may be formed to have a plurality of convex portions continuously provided in the direction of the arrangement of the light emitting diodes 14A.

In case of the above structure, because any independent lens sheet 4 needs not to be mounted, it is possible to decrease the number of parts in the whole apparatus. Accordingly, the production cost can be reduced.

As described above, according to the present invention, the optical section is provided such that the light emitted by the light emitting elements can be made approximately parallel to the direction of the optical fibers. Accordingly, the illumination distribution on the manuscript is improved. When the image sensor apparatus is applied to an image reading apparatus, the reading operation can be performed with high precision.

Also, because the illumination distribution can be improved, each of the optical fibers needs not to have a large numerical aperture. Therefore, even if there is a gap between the manuscript and the optical fiber section, the light reflected from the manuscript does not enter the optical fibers other than the predetermined optical fibers. As a result, the degradation of resolution due to the gap is prevented.

Further, according to the present invention, the above optical means is composed of the lens sheet with the uneven surface structure having a plurality of convex or concave portions along the direction of the arrangement of the light emitting elements. Therefore, the effect like above-mentioned structure can be obtained. Because the convex or concave portions are formed to have a pitch smaller than the pitch between the light emitting elements, the lens sheet can be formed to be thin. Therefore, the whole apparatus can be formed in a small size.

What is claimed is:

1. An image sensor apparatus comprising:
   a light emitting section composed of a plurality of light emitting elements provided in a longitudinal direction of said image sensor apparatus;
   optical means having an uneven structure, for changing the direction of light such that the light emerges from said optical means in a substantially parallel manner and converges to a linear region along said longitudinal direction, wherein said uneven structure including a plurality of convex or concave portions, a length of each of the plurality of convex or concave portions of said uneven structure in the longitudinal direction is smaller than a separation between adjacent two of said plurality of light emitting elements; and an image sensor section for transmitting the converged light to a manuscript and for sensing a light reflected from the manuscript.

2. An image sensor apparatus according to claim 1, wherein said optical means includes:

a cylindrical lens having a length corresponding to said light emitting section in the longitudinal direction, for converging the light, emitted from said plurality of light emitting elements, in the linear manner; and a lens sheet having said uneven structure, for directing the converged light to the manuscript.

3. An image sensor apparatus according to claim 2, wherein said uneven structure includes a plurality of uneven sections each of which is composed of said plurality of convex or concave portions, and each of said plurality of uneven sections is provided in a region corresponding to a region between every adjacent two of said plurality of light emitting elements.

4. An image sensor apparatus according to claim 2, wherein said uneven structure is said plurality of convex or concave portions which are continuously provided in the longitudinal direction for a length corresponding to said light emitting section.

5. An image sensor apparatus according to claim 1, wherein said optical means includes:

a sheet lens having said uneven structure, for directing the light emitted from said plurality of light emitting elements to the manuscript; and a cylindrical lens having a length corresponding to said light emitting section in the longitudinal direction, for converging the directed light in the linear manner.

6. An image sensor apparatus according to claim 5, wherein said uneven structure includes a plurality of uneven sections each of which is composed of said plurality of convex or concave portions, and each of said plurality of uneven sections is provided in a region corresponding to a region between every adjacent two of said plurality of light emitting elements.

7. An image sensor apparatus according to claim 5, wherein said uneven structure includes said plurality of convex or concave portions which are continuously provided in the longitudinal direction for a length corresponding to said light emitting section.

8. An image sensor apparatus according to claim 1, wherein said optical means includes:

a cylindrical lens having said uneven structure and having a length corresponding to said light emitting section in the longitudinal direction.

9. An image sensor apparatus according to claim 8, wherein said uneven structure includes a plurality of uneven sections each of which is composed of said plurality of convex or concave portions, and each of said plurality of uneven sections is provided in a region corresponding to a region between every adjacent two of said plurality of light emitting elements.

10. An image sensor apparatus according to claim 8, wherein said uneven structure includes said plurality of convex or concave portions which are continuously provided in the longitudinal direction for a length corresponding to said light emitting section.

11. An image sensor apparatus according to claim 1, wherein said plurality of convex or concave portions includes:

a plurality of subsets, each said subset including said plurality of convex or concave portions and each said subset corresponding to an associated one of said light emitting elements.

12. An image sensor apparatus comprising:

a light emitting section composed of a plurality of light emitting elements provided in a longitudinal direction;

a cylindrical lens for converging light emitted from said plurality of light emitting elements, in a linear manner in a longitudinal direction;

a lens sheet having an uneven structure, for directing the converged light to a manuscript, wherein said uneven structure is composed of a plurality of convex or concave portions, and a length of each of said plurality of convex or concave portions of said uneven structure in the longitudinal direction is smaller than a separation between adjacent two of said plurality of light emitting elements; and an image sensor section for transmitting the converged light from said lens sheets to the manuscript and for sensing a light reflected from the manuscript.

13. An image sensor apparatus according to claim 12, wherein said uneven structure includes a plurality of uneven sections each of which is composed of said plurality of convex or concave portions, and each of said plurality of uneven sections is provided in a region corresponding to a region between every adjacent two of said plurality of light emitting elements.

14. An image sensor apparatus according to claim 12, wherein each of said plurality of uneven sections includes said plurality of convex or concave portions continuously provided In the longitudinal direction for a length corresponding to said light emitting section.

15. An image sensor apparatus according to claim 12, wherein said uneven structure is provided on a side of said light emitting section.

16. An image sensor apparatus according to claim 12, wherein said uneven structure is provided on a side of the manuscript.

17. An image sensor apparatus according to claim 12, wherein said plurality of convex or concave portions includes:

a plurality of subsets, each said subset including said plurality of convex or concave portions and each said subset corresponding to an associated one of said light emitting elements.

18. An image sensor apparatus comprising:

a light emitting section composed of a plurality of light emitting elements provided in a longitudinal direction;

a lens sheet having an uneven structure, for directing to a manuscript the light emitted from said plurality of light emitting elements, wherein said uneven structure includes a plurality of convex or concave portions, and a length of each of said plurality of convex or concave portions of said uneven structure in the longitudinal direction is smaller than a separation between adjacent two of said plurality of light emitting elements;

light converging means for converging the directed light in a linear manner in the longitudinal direction; and an image sensor section for transmitting the converged light to the manuscript and for sensing a light reflected from the manuscript.

19. An image sensor apparatus according to claim 18, wherein said uneven structure includes a plurality of uneven sections each of which is composed of said plurality of convex or concave portions, and each of said plurality of uneven sections is provided in a region corresponding to a region between every adjacent two of said plurality of light emitting elements.

20. An image sensor apparatus according to claim 18, wherein said uneven structure includes said plurality of convex or concave portions which are continuously provided in the longitudinal direction for a length corresponding to said light emitting section.

21. An image sensor apparatus according to claim 18, wherein said uneven structure is provided on a side of said light emitting section.

22. An image sensor apparatus according to claim 18, wherein said uneven structure is provided on a side of the manuscript.

23. An image sensor apparatus according to claim 18, wherein said plurality of convex or concave portions includes:
   a plurality of subsets, each said subset including said plurality of convex or concave portions and each said subset corresponding to an associated one of said light emitting elements.

* * * * *